United States Patent
Ziraldo et al.

(10) Patent No.: US 12,459,597 B1
(45) Date of Patent: Nov. 4, 2025

(54) SEAT POST AND HANDLEBAR LATCHING MECHANISM FOR PERSONAL TRANSPORT DEVICE

(71) Applicant: Honda Motor Co., Ltd., Tokyo (JP)

(72) Inventors: Nicholas P. Ziraldo, Powell, OH (US); Matthew B. Staal, Torrance, CA (US); Michael Jin Kim, Long Beach, CA (US); Jackie P. Porchay, Torrance, CA (US); Ming Hsein Lee, Taichung (TW); Ding Jong Chou, Taichung (TW); Sheng Yu Huang, Taichung (TW)

(73) Assignee: HONDA MOTOR CO., LTD., Tokyo (JP)

( * ) Notice: Subject to any disclaimer, the term of this patent is extended or adjusted under 35 U.S.C. 154(b) by 786 days.

(21) Appl. No.: 17/707,279

(22) Filed: Mar. 29, 2022

(51) Int. Cl.
*B62K 15/00* (2006.01)
*B62K 19/36* (2006.01)
*B62K 21/16* (2006.01)

(52) U.S. Cl.
CPC .............. *B62K 15/00* (2013.01); *B62K 19/36* (2013.01); *B62K 21/16* (2013.01)

(58) Field of Classification Search
CPC .................. B62K 15/00; B62K 15/006; B62K 2015/001; B62K 19/00; B62K 19/36; B62K 19/30; B62K 21/00; B62K 21/16; B62K 21/12; B62J 1/08; B62J 1/00; B62J 1/10; B62J 2001/085
See application file for complete search history.

(56) References Cited

U.S. PATENT DOCUMENTS

| | | | | | |
|---|---|---|---|---|---|
| 3,993,322 | A | * | 11/1976 | Van Tijen ............ | B62K 15/006 280/281.1 |
| 4,284,288 | A | * | 8/1981 | Fulton .................. | B62K 15/006 280/278 |
| 4,422,663 | A | * | 12/1983 | Hon ..................... | B62K 15/006 280/30 |
| 4,438,942 | A | * | 3/1984 | Hon ..................... | B62K 15/006 280/274 |
| 4,462,606 | A | * | 7/1984 | Hon ..................... | B62K 15/006 280/278 |

(Continued)

FOREIGN PATENT DOCUMENTS

| | | |
|---|---|---|
| CN | 2507748 Y | 8/2002 |
| CN | 2516434 Y | 10/2002 |

(Continued)

*Primary Examiner* — James M Dolak
(74) *Attorney, Agent, or Firm* — Plumsea Law Group, LLC

(57) ABSTRACT

A compact personal transport device convertible between a riding configuration and a stowed configuration is described. In one embodiment, a latching mechanism for the compact personal transport device includes a frame post attached internally to the personal transport device and a seat post including an opening on one side. The seat post fits onto the frame post. The latching mechanism also includes a latch spring that extends outwards from one side of the frame post in an extended position and retracts inside the frame post in a retracted position. The latch spring extends through the opening in the seat post when the seat post is attached to the frame post and the latch spring is in the extended position to mechanically lock the seat post to the frame post.

15 Claims, 11 Drawing Sheets

(56) References Cited

U.S. PATENT DOCUMENTS

| | | | | |
|---|---|---|---|---|
| 4,824,130 | A * | 4/1989 | Chiu | B62K 15/008 |
| | | | | 280/281.1 |
| 4,955,628 | A | 9/1990 | Chiu | |
| 6,273,442 | B1 * | 8/2001 | Fallon | B62K 15/008 |
| | | | | 280/30 |
| 6,557,878 | B2 * | 5/2003 | Chen | B62K 19/36 |
| | | | | 280/226.1 |
| 6,581,492 | B1 | 6/2003 | Chen | |
| 6,799,771 | B2 * | 10/2004 | Bigot | B62K 15/008 |
| | | | | 280/278 |
| 6,880,848 | B2 * | 4/2005 | Liu | B62K 15/008 |
| | | | | 280/278 |
| 7,021,413 | B1 * | 4/2006 | Lee | B62K 15/00 |
| | | | | 180/181 |
| 7,080,847 | B2 * | 7/2006 | Chao | B62K 15/006 |
| | | | | 280/281.1 |
| 7,422,224 | B2 * | 9/2008 | Sicz | B62J 1/06 |
| | | | | 280/281.1 |
| 7,967,095 | B2 * | 6/2011 | Kosco | B62K 15/006 |
| | | | | 280/278 |
| 8,162,345 | B1 * | 4/2012 | Szu-Yao | B62K 15/008 |
| | | | | 280/278 |
| 8,651,212 | B2 * | 2/2014 | Vincenz | B62K 19/36 |
| | | | | 180/205.1 |
| 8,702,046 | B2 * | 4/2014 | Cooper | B60R 11/02 |
| | | | | 248/408 |
| 8,814,195 | B2 * | 8/2014 | Beistegui Chirapozu | |
| | | | | B62K 15/006 |
| | | | | 280/281.1 |
| 8,894,084 | B1 * | 11/2014 | Yap | B62K 15/008 |
| | | | | 280/278 |
| 9,475,538 | B2 * | 10/2016 | Wang | B62K 15/008 |
| 9,573,646 | B2 * | 2/2017 | Lloyd | G06F 1/1698 |
| 9,598,136 | B1 * | 3/2017 | Kim | B62K 21/00 |
| 9,873,477 | B2 * | 1/2018 | Wunderlin | B62K 21/24 |
| 9,896,148 | B2 * | 2/2018 | Baba | B62K 19/02 |
| 9,981,707 | B1 * | 5/2018 | Chen | B62H 5/001 |
| 10,569,821 | B1 * | 2/2020 | Wu | B62J 43/20 |
| 11,919,590 | B2 * | 3/2024 | Hoffmann | B62J 1/08 |
| 11,981,389 | B1 * | 5/2024 | Kim | B62J 45/00 |
| 12,054,219 | B2 * | 8/2024 | Demond | B62M 6/55 |
| 12,128,982 | B1 * | 10/2024 | Kuo | B62K 15/006 |
| 12,251,598 | B2 * | 3/2025 | Moreira | B62K 19/36 |
| 12,275,476 | B2 * | 4/2025 | Staples | B62J 1/08 |
| 12,275,482 | B1 * | 4/2025 | Staal | B62K 25/04 |
| 2003/0155738 | A1 | 8/2003 | Chen et al. | |
| 2006/0166792 | A1 | 7/2006 | Kuo | |
| 2009/0115149 | A1 * | 5/2009 | Wallis | B60N 2/507 |
| | | | | 280/6.159 |
| 2012/0024102 | A1 | 2/2012 | Marion | |

FOREIGN PATENT DOCUMENTS

| | | |
|---|---|---|
| CN | 1282583 C | 11/2006 |
| CN | 201023581 Y | 2/2008 |
| CN | 204489073 U | 7/2015 |
| CN | 207060283 U | 3/2018 |
| CN | 108583744 A | 9/2018 |
| CN | 209617366 U | 11/2019 |
| CN | 212267692 U | 1/2021 |
| FR | 2928338 B1 | 1/2011 |
| JP | 4648599 B2 | 3/2011 |
| KR | 20100077550 A | 7/2010 |

* cited by examiner

SEAT POST AND HANDLEBAR LATCHING MECHANISM FOR PERSONAL TRANSPORT DEVICE

BACKGROUND

This disclosure relates generally to vehicles, and in particular to a seat post and handlebar latching mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a latching mechanism for a personal transport device is provided. The latching mechanism includes a frame post attached internally to the personal transport device and a seat post including an opening on one side. The seat post is configured to fit onto the frame post. The latching mechanism also includes a latch spring that extends outwards from one side of the frame post in an extended position and retracts inside the frame post in a retracted position. The latch spring extends through the opening in the seat post when the seat post is attached to the frame post and the latch spring is in the extended position to mechanically lock the seat post to the frame post.

In another aspect, a seat assembly for a personal transport device is provided. The seat assembly includes a seat having a seat surface and a seat post attached to an underside of the seat. The seat post including an opening on one side. The seat post is configured to removably attach to a frame post of the personal transport device. The seat assembly also includes a latching mechanism having a latch spring that extends outwards from one side of the frame post in an extended position and retracts inside the frame post in a retracted position. The latch spring extends through the opening in the seat post when the seat post is attached to the frame post and the latch spring is in the extended position to mechanically lock the seat post to the frame post.

In another aspect, a compact personal transport device is provided. The compact personal transport device includes an outer casing extending between a top edge and a bottom edge in a vertical direction and extending between a front edge and a rear edge in a horizontal direction. An opening is disposed along a top surface of the outer casing. The compact personal transport device also includes a frame post attached internally inside the outer casing, the frame post extending in the vertical direction. The compact personal transport device also includes a seat assembly configured to be removably mounted on the frame post of the compact personal transport device through the opening. The seat assembly includes a seat having a seat surface and a seat post attached to an underside of the seat. The seat post including an opening on one side. The seat post is configured to removably attach to the frame post of the compact personal transport device. The seat assembly further includes a latching mechanism having a latch spring that extends outwards from one side of the frame post in an extended position and retracts inside the frame post in a retracted position. The latch spring extends through the opening in the seat post when the seat post is attached to the frame post and the latch spring is in the extended position to mechanically lock the seat post to the frame post.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a seat post and handlebar latching mechanism that assists with securing components of the personal transport device in a riding configuration and a stowed configuration are described herein. The techniques described in connection with the present embodiments may be used to provide a personal transport device having a seat post and handlebar latching mechanism that functions to secure the seat post in a riding configuration and also functions to secure the folded handlebar in place in a stowed configuration. In the stowed configuration, the personal transport device has a compact form factor with a handle that allows a user to carry it in a primary vehicle, on public transportation, and/or on other forms of transportation to be used for "last-mile" or "first-mile" trips to and from a destination.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stored inside the outer casing.

Figure 1:
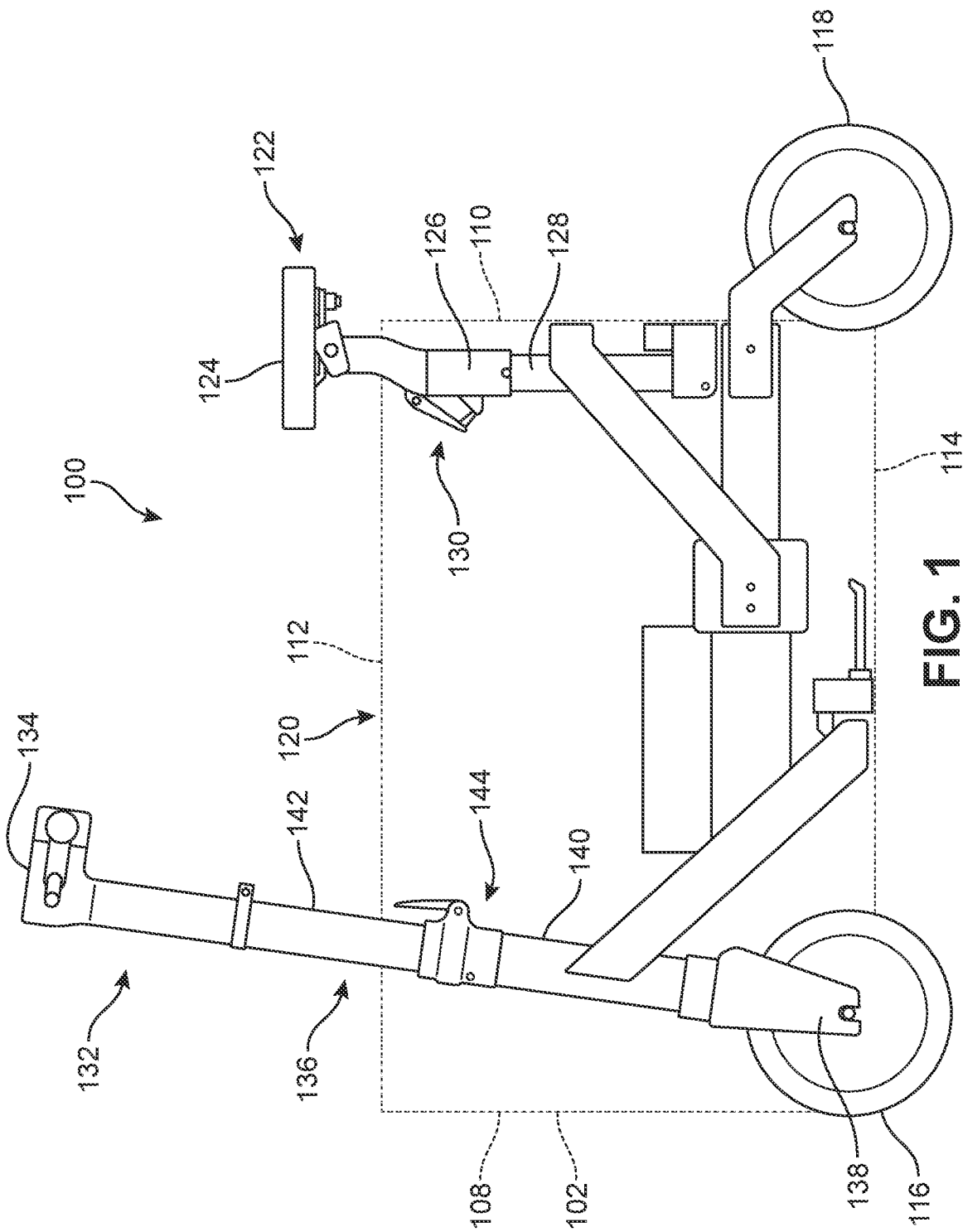
FIG. 1 is a side internal view of an example embodiment of a compact personal transport device in the form of an electric scooter in a riding configuration in accordance with aspects of the present disclosure.

Referring now to FIG. 1, an example embodiment of a personal transport device 100 (e.g., in the form of an electric scooter 100) is shown. In some embodiments, electric scooter 100 may be quickly transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stored positions inside outer casing 102. As shown in FIG. 1, electric scooter 100 is in the riding configuration (FIG. 9, described in detail below, shows electric scooter 100 in the stowed configuration).

Figure 3:
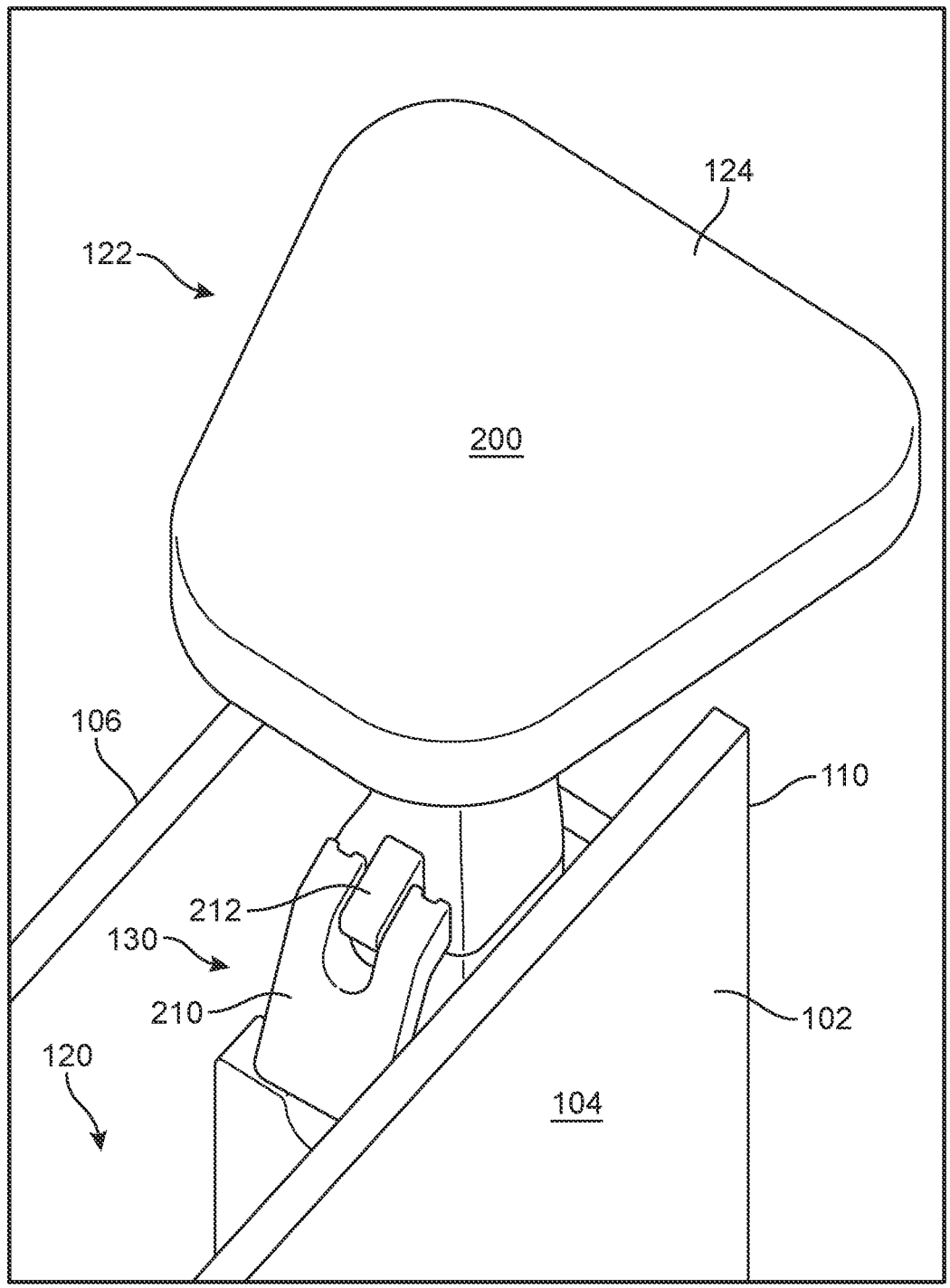
FIG. 3 is a close up view of the example embodiment of the seat assembly including the latching mechanism in a locked configuration on the electric scooter in accordance with aspects of the present disclosure.
Figure 4:
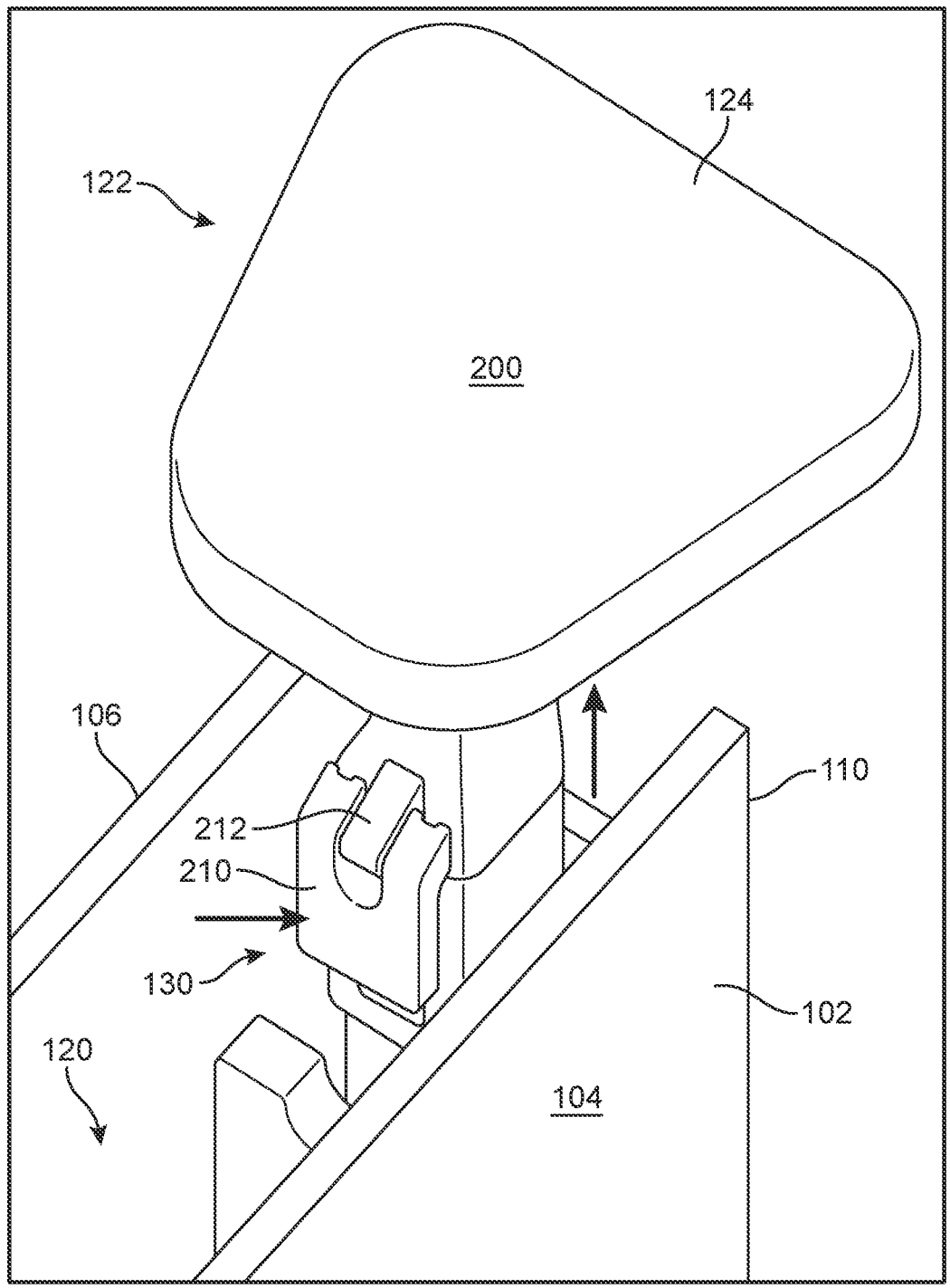
FIG. 4 is a close up view of the example embodiment of the seat assembly including the latching mechanism in an unlocked configuration in accordance with aspects of the present disclosure.

In an example embodiment, outer casing 102 of electric scooter 100 (shown in outline) includes a first side surface 104 and an opposite second side surface 106 (shown in FIGS. 3 and 4). Outer casing 102 has a width between the first side surface 104 and the opposite second side surface 106 that defines a thickness of electric scooter 100. In an example embodiment, side surfaces of outer casing 102 are substantially flat, including each of first side surface 104 and the opposite second side surface 106. Outer casing 102 of electric scooter 100 extends between a front edge 108 and an opposite rear edge 110, as well as a top edge 112 and an opposite bottom edge 114. Front edge 108, rear edge 110, top edge 112, and bottom edge 114 are substantially straight and define an outer perimeter of rectangular-shaped outer casing 102 of electric scooter 100.

In this embodiment, a front wheel 116 is visible along bottom edge 114 of electric scooter 100 near front edge 108. Electric scooter 100 also includes a rear wheel 118 that is shown extended outside of outer casing 102 (i.e., in the riding configuration as shown in FIG. 1) along bottom edge 114 near rear edge 110. Rear wheel 118 is configured to slide or retract inside of outer casing 102 in the stowed configuration.

Electric scooter 100 includes a top surface disposed between first side surface 104 and the opposite second side surface 106. In an example embodiment, the top surface includes an opening 120 (shown in FIGS. 3 and 4) extending substantially along the length of electric scooter 100 (i.e., from front edge 108 to rear edge 110). In one embodiment, opening 120 is disposed spaced from front edge 108 of electric scooter 100 and extends all the way to rear edge 110. In some embodiments, opening 120 extends to rear edge 110 along the top surface 118 partially extends down rear edge 110. In this embodiment, opening 120 is in the form of a slot disposed between first side surface 104 and the opposite second side surface 106.

In some embodiments, electric scooter 100 includes components configured to allow a user to ride electric scooter 100 in the riding configuration. For example, in this embodiment, electric scooter 100 includes a seat assembly 122 and a steering assembly 132. In one embodiment, seat assembly 122 includes a seat 124 attached on top of a seat post 126 that is configured to mount to a corresponding frame post 128 that is attached internally to the inside of electric scooter 100 (e.g., inside outer casing 102). In an example embodiment, seat assembly 122 is configured to be removably attached to electric scooter 100.

According to the example embodiments described herein, seat assembly 122 also includes a seat post and handlebar latching mechanism 130 (also referred to herein as "latching mechanism" 130). In an example embodiment, latching mechanism 130 is configured to secure seat post 126 on frame post 128 when electric scooter 100 is in the riding configuration. With this arrangement, a user of electric scooter 100 may sit on seat 124 of seat assembly 122 while riding electric scooter 100 in the riding configuration.

In some embodiments, steering assembly 132 is configured to control orientation of front wheel 116 to allow a user to steer electric scooter 100 in the riding configuration. In an example embodiment, steering assembly 132 includes a handlebar 134 that is configured to receive hands of a user to steer front wheel 116. In one embodiment, steering assembly 132 includes a steering shaft 136 with a fork 138 that is attached to an axle of front wheel 116 at one end. The opposite end of fork 138 is attached to a lower portion 140 of steering shaft 136 disposed inside of outer casing 102 of electric scooter 100. Handlebar 134 is located at a top end of steering shaft 136 and is connected to an upper portion 142 of steering shaft 136. Upper portion 142 of steering shaft 136 extends downwards towards top edge 112 of electric scooter 100 and is extended outside of outer casing 102 of electric scooter 100 through opening 120 when electric scooter 100 is in the riding configuration (as shown in FIG. 1).

As shown in FIG. 1, steering shaft 136 of electric scooter 100 extends upwards from opening 120 when electric scooter 100 is in the riding configuration and is configured to be folded downwards into opening 120 to transition electric scooter 100 to the stowed configuration, as will be described below. In this embodiment, handlebar 134 is shown in an extended position with a substantially horizontal orientation so that handlebar 134 is approximately perpendicular to steering shaft 136. Handlebar 134 and steering shaft 136 are configured to allow a user to control orientation of front wheel 116 to steer electric scooter 100 in the riding configuration.

In an example embodiment, one or more portions of steering shaft 136 may be telescopic. That is, one or more portions of steering shaft 136 may be formed of concentric tubular sections designed to slide into one another to collapse or extend steering shaft 136. For example, in one embodiment, upper portion 142 of steering shaft 136 may be telescopic. With this arrangement, a height of steering shaft 136 may be transitioned between a taller height in an extended position when electric scooter 100 is in the riding configuration and a shorter height in a folded position when electric scooter 100 is in the stowed configuration.

Figure 9:
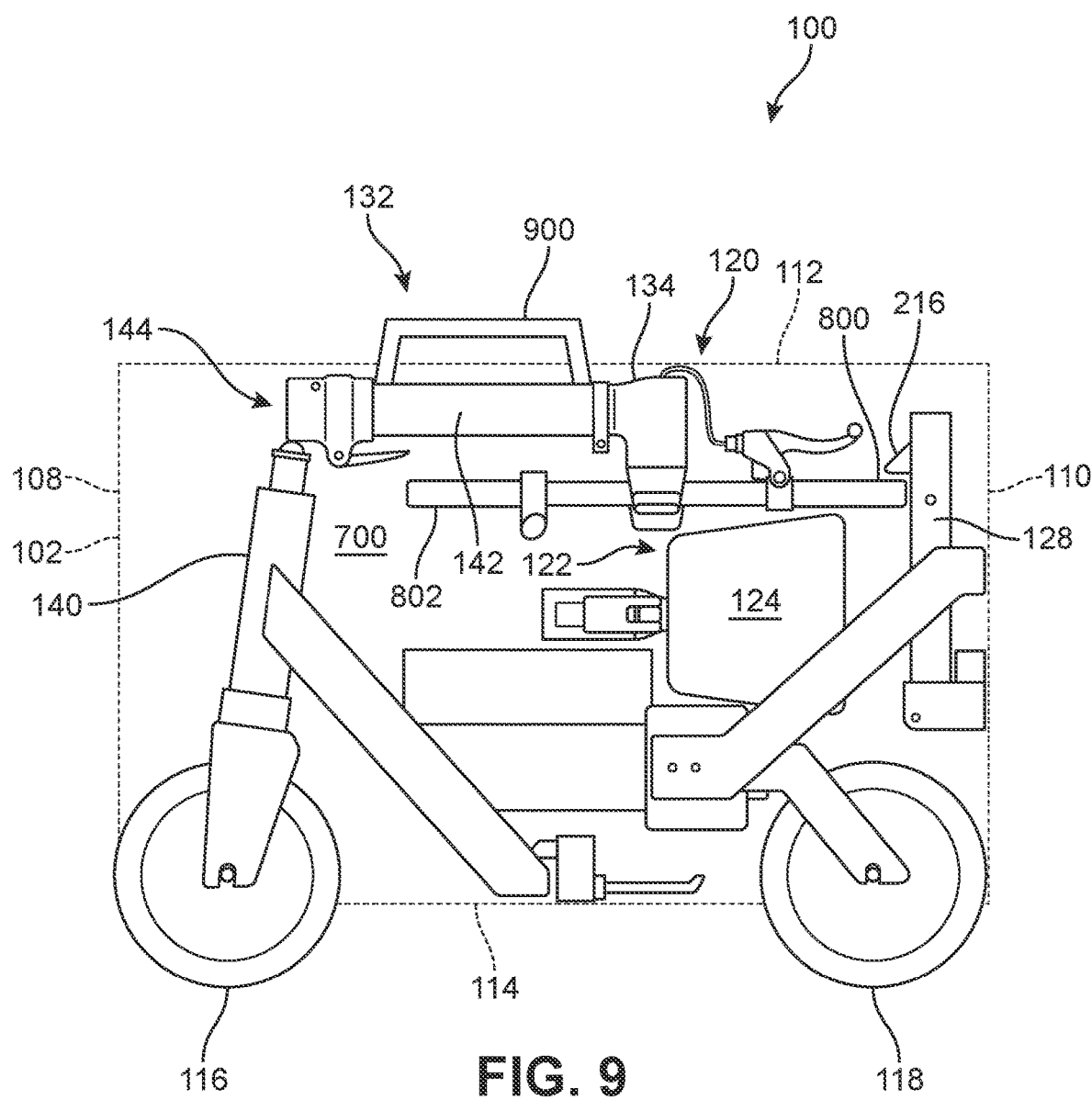
FIG. 9 is a representative view of the example embodiment of the electric scooter in the stowed configuration in accordance with aspects of the present disclosure.

Lower portion 140 of steering shaft 136 extends upwards from fork 138 towards top edge 112 of electric scooter 100 to a shaft connection mechanism 144 that includes a hinge (or similar mechanism) that connects lower portion 140 and upper portion 142 of steering shaft 136. With this arrangement, steering assembly 132 may be transitioned or converted from an upright extended position when electric scooter 100 is in the riding configuration (as shown in FIG. 1) to a folded position when electric scooter 100 is in the stowed configuration (as shown in FIG. 9).

It should be understood that a personal transport device according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described herein.

Figure 2:
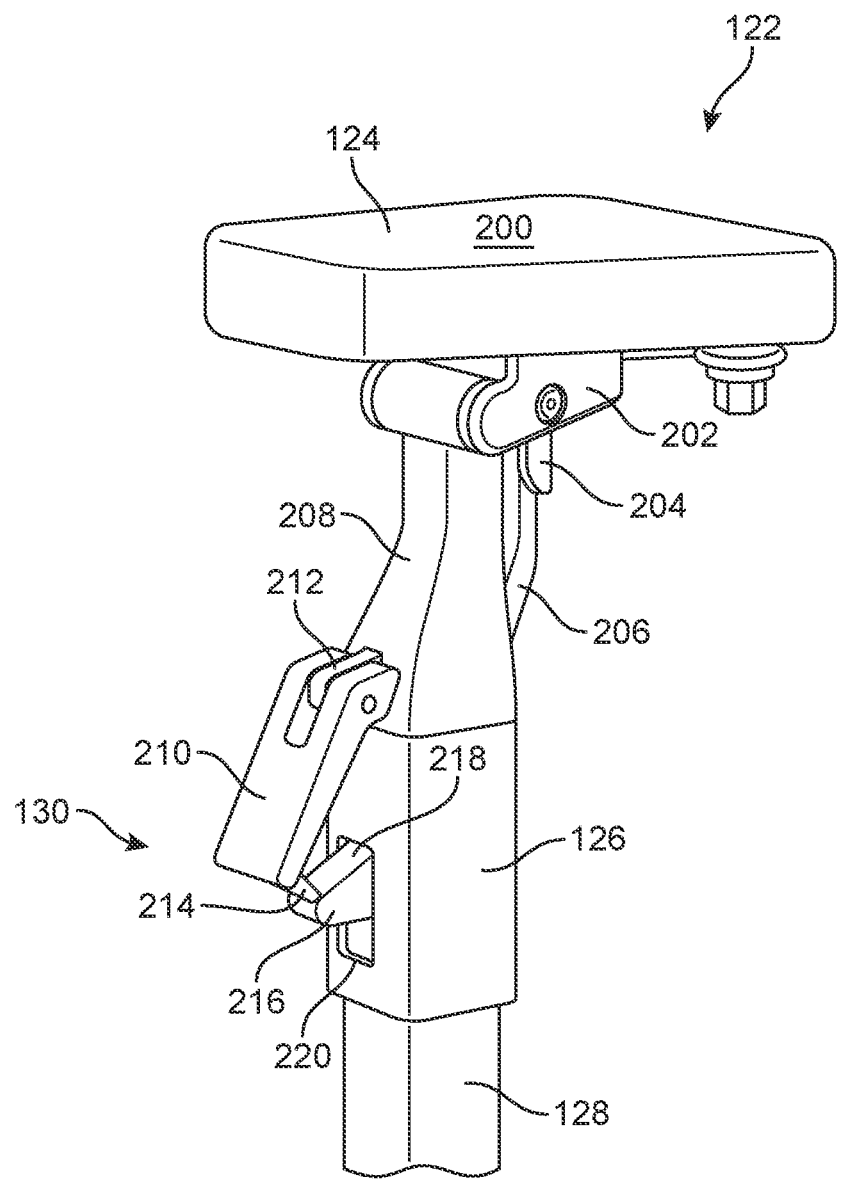
FIG. 2 is an enlarged isometric view of an example embodiment of a seat assembly for the electric scooter including a latching mechanism in accordance with aspects of the present disclosure.

In some embodiments, electric scooter 100 may include latching mechanism 130 that allows a user to quickly remove seat assembly 122 to transition electric scooter 100 from the riding configuration to the stowed configuration. Referring now to FIG. 2, an enlarged isometric view of seat assembly 122 is shown. Seat assembly 122 includes seat 124 having a seat surface 200 configured to allow a user to sit on seat 124 to ride electric scooter 100 in the riding configuration. Seat surface 200 is a substantially rectangular planar surface that has an approximately horizontal orientation when electric scooter 100 is in the riding configuration.

In some embodiments, seat 124 of seat assembly 122 is attached to seat post 126 via a tilt mechanism 202. In an example embodiment, tilt mechanism 202 may include a hinge or similar mechanism that allows seat 124 to tilt or fold. In one embodiment, tilt mechanism 202 permits seat 124 to tilt or fold from a first orientation (e.g., riding position) where seat 124 is substantially perpendicular to seat post 126 so that seat surface 200 has the approximately horizontal orientation when electric scooter 100 is in the riding configuration to a second orientation (e.g., folded position) where seat 124 is substantially parallel to seat post 126 so that seat assembly 122 may be stored inside outer casing 102 of electric scooter 100 in the stowed configuration. With this arrangement, tilt mechanism 202 may assist a user with converting electric scooter 100 from the riding configuration to the stowed configuration.

In some embodiments, tilt mechanism 202 may be engaged or operated via a tilt engagement member 204 that slides vertically along a sliding track 206 extending downwards along seat post 126 from an underside of seat 124. Tilt engagement member 204 may act to engage tilt mechanism 202 at the top of sliding track 206 to release seat 124 from the riding position so that seat 124 may be tilted or folded forward to the folded position. Tilt engagement member 204 may slide downwards along sliding track 206 to disengage tilt mechanism 202 and permit seat 124 to be locked in the riding position.

In an example embodiment, seat post 126 of seat assembly 122 includes a neck portion 208 that is attached to tilt mechanism 202 on the underside of seat 124. Neck portion 208 of seat post 126 narrows or tapers as it extends upwards from the bottom of seat post 126 towards the underside of seat 124. In some embodiments, seat post 126 of seat assembly 122 is configured to fit or slide onto frame post 128 to removably attach seat assembly 122 to electric scooter 100. For example, in some embodiments, the bottom portion of seat post 126 may have inside dimensions that are larger than outside dimensions of a top portion of frame post 128 so that a portion of seat post 126 may extend over a portion of frame post 128. With this arrangement, a user may sit on seat 124 of seat assembly 122 when electric scooter 100 is in the riding configuration. As will be further described below, latching mechanism 130 is configured to lock or secure seat post 126 onto frame post 128 so that seat assembly 122 remains in place while electric scooter 100 is being ridden in the riding configuration.

In an example embodiment, neck portion 208 of seat post 126 has inside dimensions that are smaller than the outside dimensions of frame post 128 so that when seat assembly 122 is mounted on frame post 128 the smaller inside dimensions of neck portion 208 of seat post 126 prevent seat post 126 from extending farther down in the vertical direction over frame post 128. In other words, the narrower configuration of neck portion 208 of seat post 126 stops or limits the vertical movement of seat post 126 on top of frame post 128.

In some embodiments, latching mechanism 130 includes a release lever 210. Release lever 210 is attached to neck portion 208 of seat post 126 via a hinge 212 or similar mechanism that allows release lever 210 to pivot or move in a substantially vertical direction. As shown in FIG. 2, release lever 210 is attached to neck portion 208 of seat post 126 on a front side (e.g., facing towards front edge 108 of electric scooter 100 when seat assembly 122 is mounted on frame post 128). In one embodiment, release lever 210 includes an engaging tip 214 that is angled or oriented in a direction facing towards seat post 126. In an example embodiment, engaging tip 214 of release lever 210 is configured to engage or contact a latch spring 216 that secures seat post 126 on frame post 128.

In some embodiments, latching mechanism 130 includes latch spring 216 that is attached or connected to a top portion of frame post 128. Latch spring 216 includes a spring or other biasing member that causes latch spring 216 to extend outwards substantially perpendicular to frame post 128 and/or seat post 126 when latch spring 216 is in an extended position. In the extended position, latch spring 216 may extend through a post opening 220 on the bottom portion of seat post 126 of seat assembly 122. For example, as shown in FIG. 2, latch spring 216 is shown extending through post opening 220 of seat post 126 so that seat post 126 may be locked or secured on frame post 128. That is, when latch spring 216 extends through post opening 220 of seat post 126, removal of seat assembly 122 is prevented by the mechanical interlock or interaction formed between frame post 128 and seat post 126 by latch spring 216.

In an example embodiment, latch spring 216 has a generally triangular shaped body with an upper sloped surface 218 located on the top of latch spring 216. Upper sloped surface 218 of latch spring 216 is configured to be engaged or contacted by engaging tip 214 of release lever 210. When a force is applied to release lever 210, engaging tip 214 of release lever 210 may contact or engage against upper sloped surface 218 to push against the spring or biasing member of latch spring 216 to cause latch spring 216 to move inwards to a retracted position inside frame post 128. When latch spring 216 is pushed inwards by engaging tip 214 of release lever 210, latch spring 216 is removed from within post opening 220 in seat post 126. In the retracted position, latch spring 216 no longer mechanically interlocks frame post 128 and seat post 126 and seat assembly 122 may be removed by pulling upwards to separate seat post 126 from frame post 128.

In an example embodiment, the process of releasing latching mechanism 130 to permit seat assembly 122 to be removed from electric scooter 100 is described with reference to FIGS. 3 and 4. Referring now to FIG. 3, a close up view of seat assembly 122 including latching mechanism 130 is shown in a locked configuration on electric scooter 100. In this embodiment, seat assembly 122 is shown with seat post 126 mounted on frame post 128 of electric scooter 100. As shown in FIG. 3, when seat assembly 122 is configured for use by a user when electric scooter 100 is in the riding configuration, seat assembly 122 is disposed between first side surface 104 and opposite second side surface 106 of outer casing 102 within opening 120. In this configuration, latching mechanism 130 is in a locked configuration with latch spring 216 extending through post opening 220 in seat post 126 (as described above in reference to FIG. 2) to secure seat assembly 122 on frame post 128 of electric scooter 100. With this arrangement, seat 124 is substantially perpendicular to seat post 126 so that seat surface 200 has an approximately horizontal orientation when electric scooter 100 is in the riding configuration.

Referring now to FIG. 4, a close up view of seat assembly 122 including latching mechanism 130 is shown in an unlocked configuration. In an example embodiment, when a user transitions electric scooter 100 from the riding configuration to the stowed configuration, seat assembly 122 may be removed from frame post 128 of electric scooter 100 and stored inside outer casing 102 of electric scooter 100. In one embodiment, release lever 210 may be used to release or unlock latching mechanism 130 from the locked configuration (as shown in FIG. 3) to the unlocked configuration (as shown in FIG. 4).

For example, as shown in FIG. 4, a force may be applied to release lever 210 to press release lever 210 inwards towards seat post 126. Release lever 210 is attached to seat post 126 via hinge 212 so that the force applied to release lever 210 causes release lever 210 to press inwards against latch spring 216. As described above, engaging tip 214 of release lever 210 contacts or engages against upper sloped surface 218 to push against the spring or biasing member of latch spring 216 to cause latch spring 216 to move inwards to a retracted position inside frame post 128. With latch spring 216 in the retracted position, latch spring 216 no longer extends through post opening 220 of seat post 126 and seat post 126 may be removed from its connection with frame post 128 by pulling seat assembly 122 upwards, as shown in FIG. 4. With this arrangement, latching mechanism 130 may be unlocked to permit seat assembly 122 to be removed from electric scooter 100.

Figure 5:
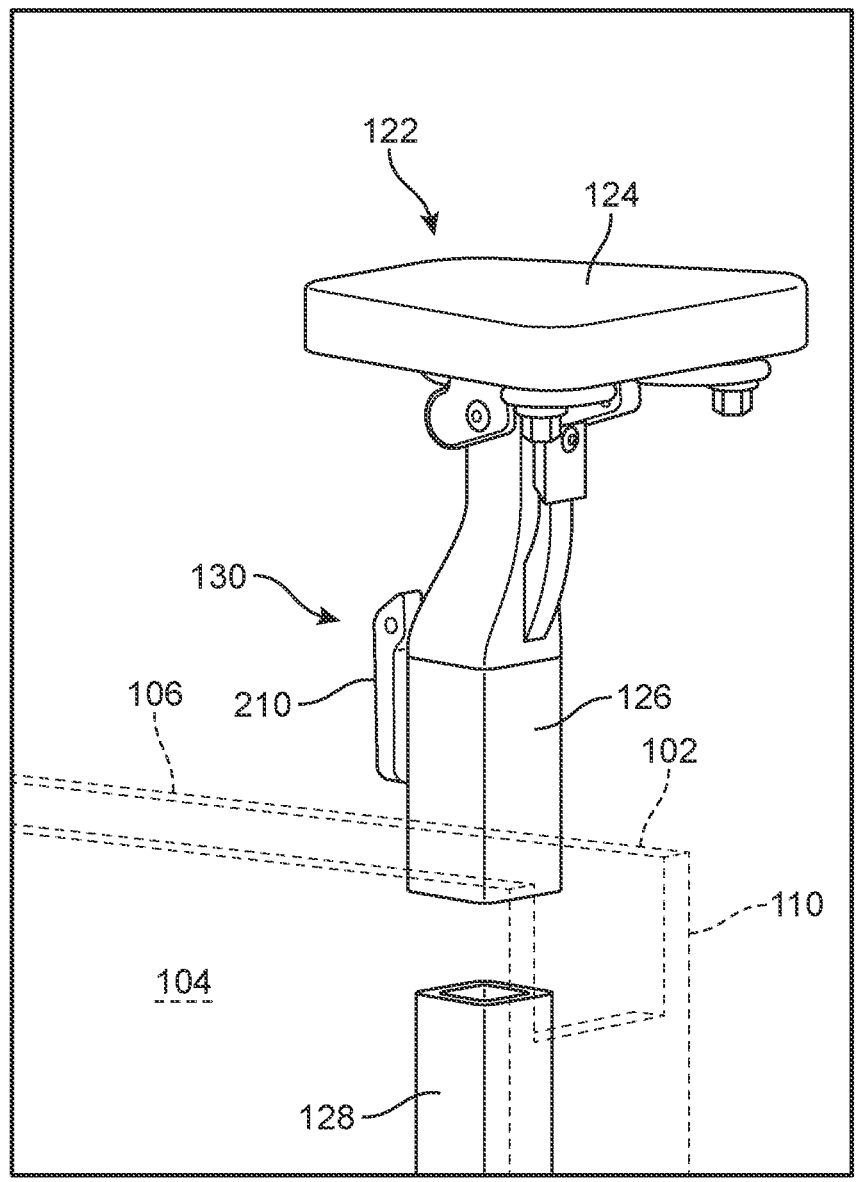
FIG. 5 is a close up view of the seat assembly being removed from the electric scooter in accordance with aspects of the present disclosure.
Figure 6:
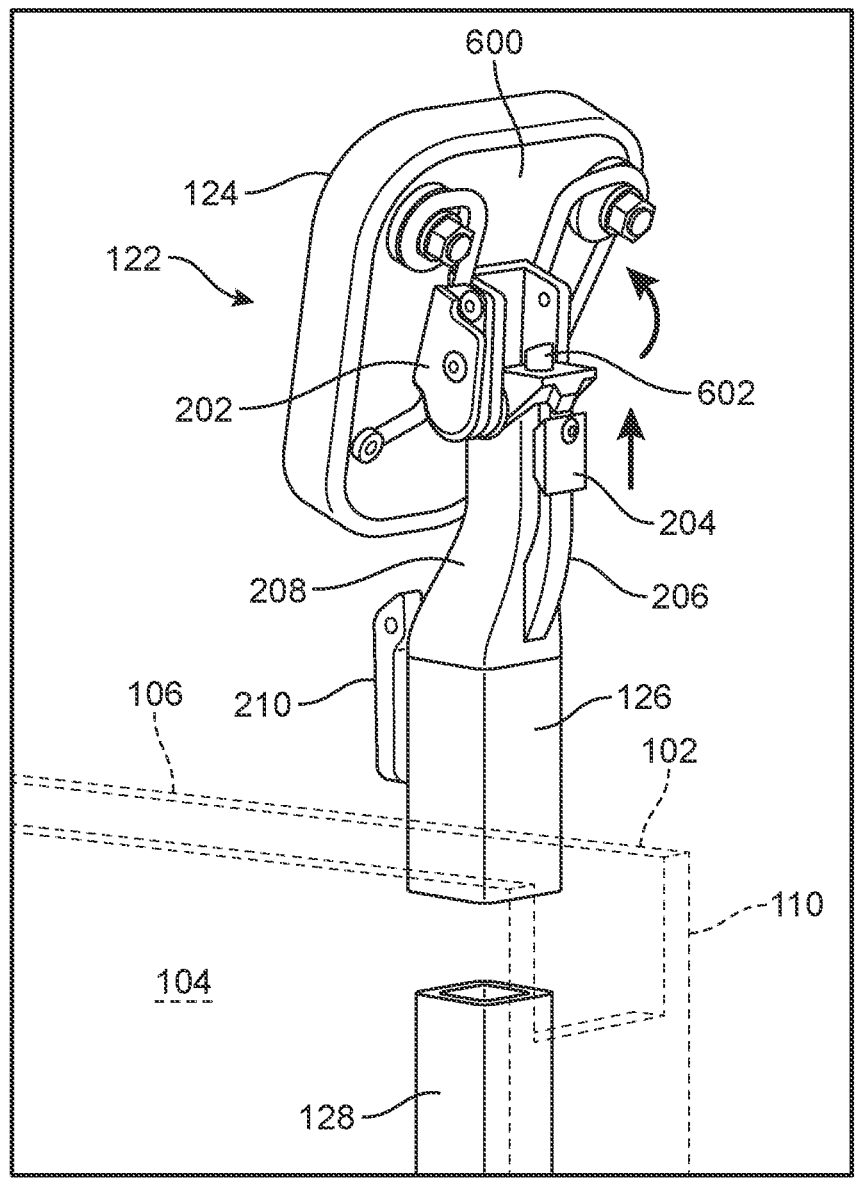
FIG. 6 is a close up view of the seat of the seat assembly being folded forward in accordance with aspects of the present disclosure.

Referring now to FIG. 5, seat assembly 122 is shown removed from electric scooter 100, for example, following the process of unlocking latching mechanism 130 as described with reference to FIGS. 3 and 4. In this embodiment, the bottom portion of seat post 126 is shown removed from and disconnected from its attachment with the top portion of frame post 128. In an example embodiment, once seat assembly 122 is removed from electric scooter 100, it may be folded for storage inside outer casing 102 of electric scooter 100. For example, as shown in FIG. 6, in some embodiments, seat 124 of seat assembly 122 may be tilted or folded forwards (e.g., in a direction towards front edge 108 of electric scooter 100 away from rear edge 110) so that seat assembly 122 may be placed in a folded position. In the folded position, seat assembly 122 may fit within opening 120 between first side surface 104 and opposite second side surface 106 of outer casing 102 and be stored within an internal storage compartment of electric scooter 100.

For example, in this embodiment, seat 124 of seat assembly 122 may tilt or fold forwards via tilt mechanism 202 mounted on neck 208 of seat post 126 and attached to an underside 600 of seat 124. In an example embodiment, tilt mechanism 202 may be engaged by sliding tilt engagement member 204 vertically upwards along sliding track 206 towards underside 600 of seat 124. A projection 602 disposed at the top of neck 208 of seat post 126 acts to engage tilt mechanism 202 when tilt engagement member 204 reaches the top of sliding track 206 to release seat 124 from the riding position so that seat 124 may be tilted or folded forward to the folded position, as shown in FIG. 6.

Figure 7:
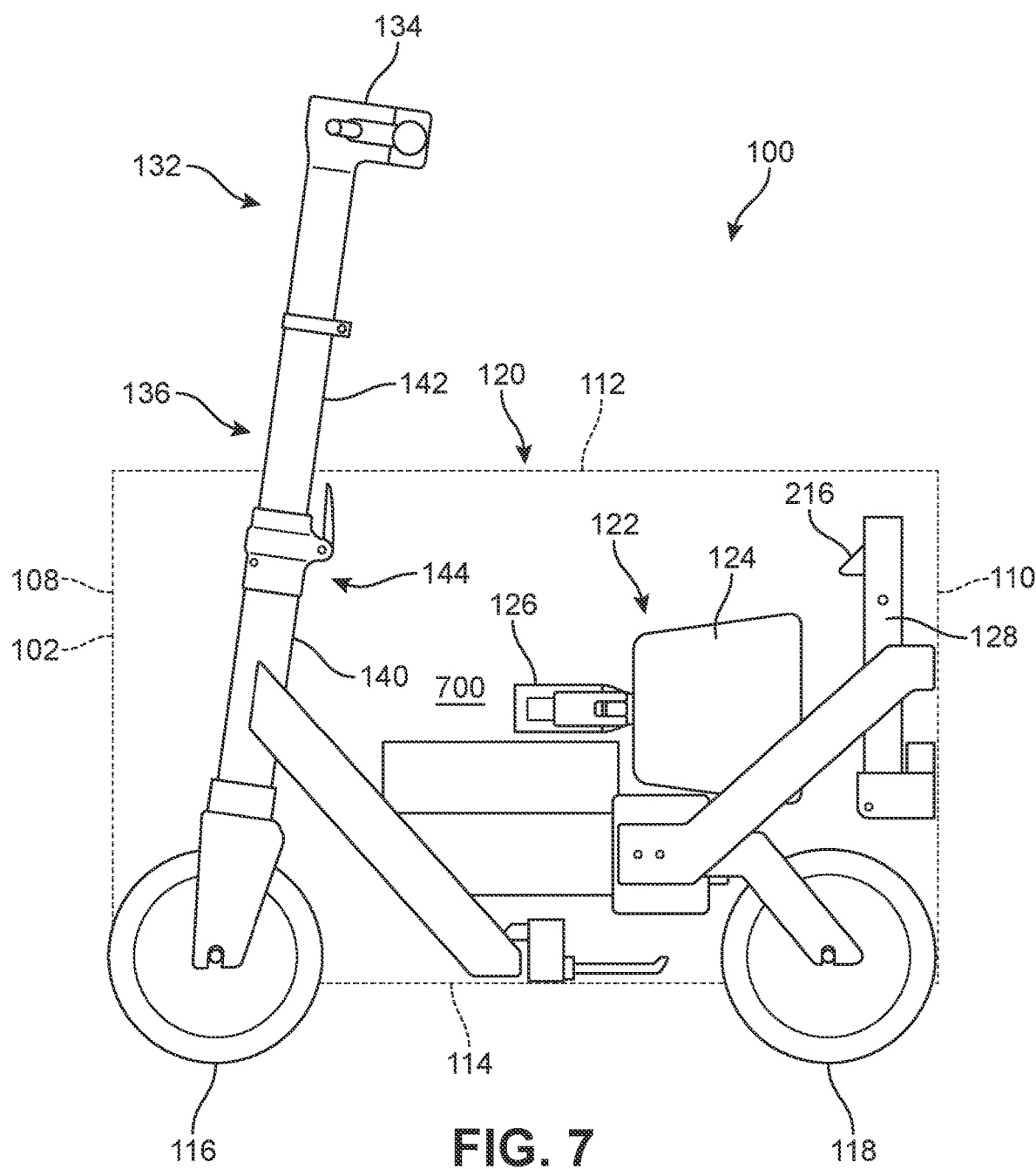
FIG. 7 is a side internal view of the example embodiment of the electric scooter with the seat assembly stored inside an internal storage compartment in accordance with aspects of the present disclosure.

Once seat 124 of seat assembly 122 is in the folded position, seat assembly 122 may be conveniently stored inside outer casing 102 of electric scooter 100. For example, as shown in FIG. 7, seat assembly 122 with seat 124 in the folded position is stored within the interior of electric scooter 100. In some embodiments, seat assembly 122 may be placed into an interior storage compartment 700. In this embodiment, seat assembly 122 is placed into interior storage compartment 700 with the bottom portion of seat post 126 facing towards front edge 108 of electric scooter 100 and seat 124 facing towards rear edge 110 of electric scooter 100. In other embodiments, interior storage compartment 700 may have different arrangements to accommodate other orientations or placements of seat assembly 122 within the interior of electric scooter 100.

Figure 8:
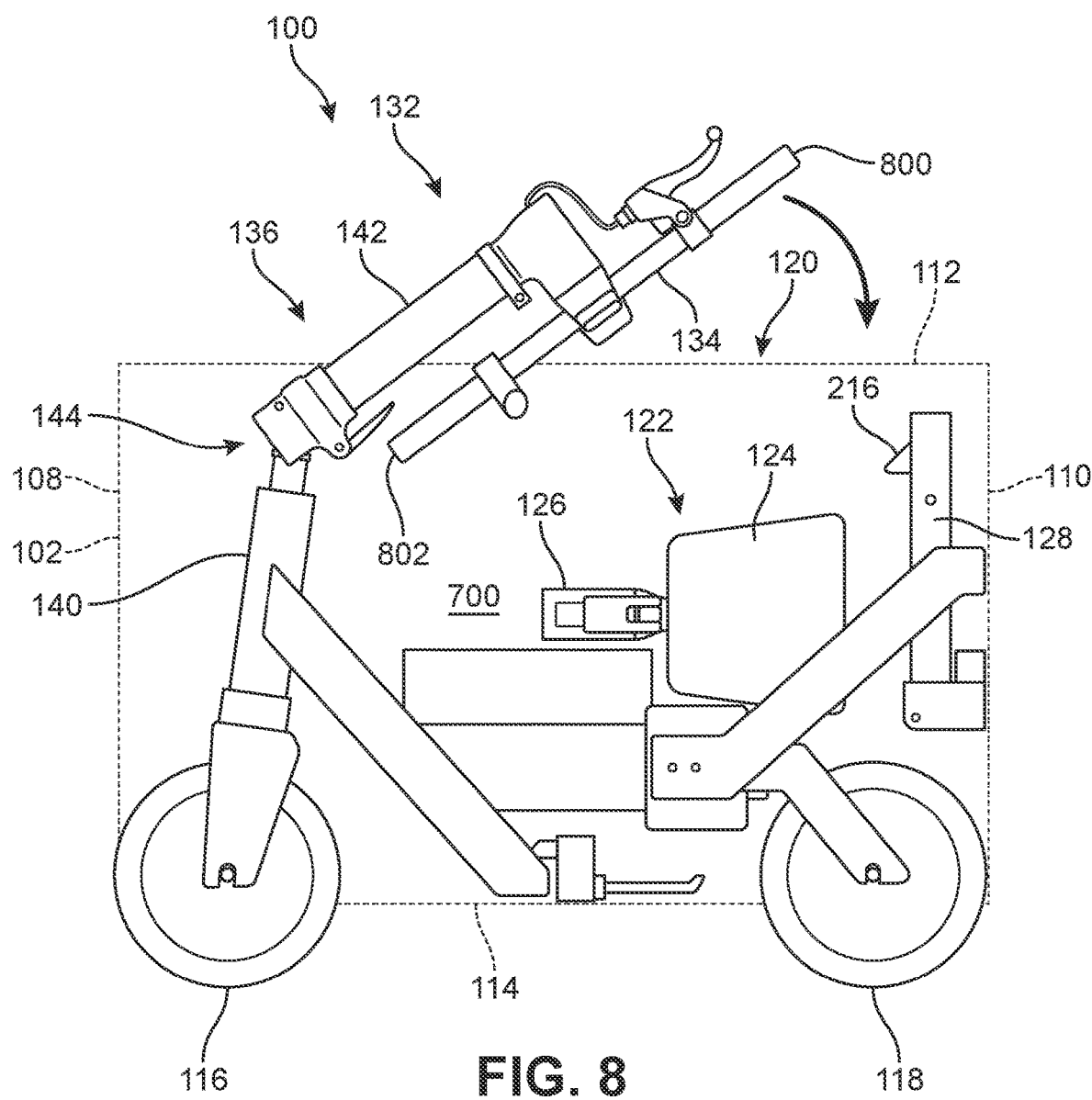
FIG. 8 is a representative side view of the example embodiment of the electric scooter in the process of folding handlebars to the stowed configuration in accordance with aspects of the present disclosure.

Referring now to FIG. 8, in some embodiments, seat post and handlebar latching mechanism 130 may also be configured to securely hold handlebar 134 of steering assembly 132 in the folded position when electric scooter 100 is in the stowed configuration. For example, as shown in FIG. 8, steering assembly 132 is configured to fold down into opening 120 along top edge 112 of electric scooter 100. In an example embodiment, steering assembly 132 includes a rotatable collar that may be rotated to move handlebar 134 from a horizontal orientation in the riding configuration orientation (e.g., perpendicular to steering shaft 136) to a vertical orientation in the stowed configuration (e.g., parallel to steering shaft 136). Handlebar 134 includes a pair of grips configured to allow a user to grab and hold onto handlebar 134 to steer electric scooter 100. In this embodiment, handlebar 134 includes a grip at first end 800 and another grip at the opposite second end 802.

In this embodiment, steering assembly 132 is shown with handlebar 134 in a vertical orientation (e.g., parallel to steering shaft 136) with first end 800 of handlebar 134 facing upwards and second end 802 of handlebar 134 facing downwards. In this embodiment, steering assembly 132 includes steering shaft 136 having upper portion 142 and lower portion 140 connected by shaft connection mechanism 144 that includes a hinge (or similar mechanism). In the riding configuration, steering shaft 136 of steering assembly 132 is in an extended position extending above opening 120 and top edge 112 of outer casing 102 of electric scooter 100. As described above, in some embodiments, one or more portions of steering shaft 136 may be telescopic. For example, in this embodiment, upper portion 142 of steering shaft 136 is telescopic and includes two segments, including a first segment that has an outside diameter that is smaller than an inside diameter of a second segment so that the first segment may slide or collapse into the second segment.

In some embodiments, a user may initiate the process of collapsing steering assembly 132 of electric scooter 100 from the riding configuration to the stowed configuration by collapsing or sliding the telescoping segments of upper portion 142 into each other to move steering shaft 136 from its initial extended position to a shorter, collapsed position. Next, once steering shaft 136 has been collapsed, steering assembly 132 may be folded into outer casing 102 of electric scooter 100 through opening 120 at top edge 112. As shown in FIG. 8, steering assembly 132 is shown in an intermediate position in the process of being folded into outer casing 102 of electric scooter 100 through opening 120 as electric scooter 100 is being transitioned to the stowed configuration.

In an example embodiment, shaft connection mechanism 144 may be unlocked to allow steering shaft 136 to fold into opening 120. Shaft connection mechanism 144 may include a hinge or similar mechanism that allows upper portion 142 of steering shaft 136 to fold from a generally vertical orientation outside of outer casing 102 (e.g., when electric scooter 100 is in the riding configuration) to a generally horizontal orientation inside of outer casing 102 (e.g., when electric scooter 100 is in the stowed configuration). In this embodiment, lower portion 140 of steering shaft 136 remains stationary. In an example embodiment, when steering shaft 136 is folded at shaft connection mechanism 144, upper portion 142 of steering shaft 136 and handlebar 134 in the vertical orientation are folded into outer casing 102 of electric scooter 100 through opening 120 at top edge 112. That is, steering assembly 132 is fully folded into outer casing 102 of electric scooter 100 in the stowed configuration.

Referring now to FIG. 9, electric scooter 100 is shown in its fully stowed configuration. In this embodiment, steering assembly 132, including handlebar 134 in the vertical orientation, is folded inside of outer casing 102 of electric scooter 100 (e.g., within interior storage compartment 700). When electric scooter 100 is collapsed from the riding configuration (as shown in FIG. 1) to the stowed configuration (as shown in FIG. 9), electric scooter 100 has a compact form factor that may be easily and conveniently carried by a user.

In some embodiments, a carry handle 900 may be mounted on a portion of steering shaft 136 so that electric scooter 100 in the stowed configuration may be easily carried or moved by a user. In an example embodiment, carry handle 900 is attached to upper portion 142 of steering shaft 136 of steering assembly 132 so that carry handle 900 projects or extends upwards and above opening 120 at top edge 112 of outer casing 102 of electric scooter 100. In one embodiment, carry handle 900 has a generally C-shape with two opposite ends attached to upper portion 142 of steering shaft 136. In other embodiments, carry handle 900 may have other configurations or shapes.

In some embodiments, latching mechanism 130 of the example embodiments may further assist with securing steering assembly 132 and handlebar 134 in the folded position inside outer casing 102 of electric scooter 100 so that when a user lifts electric scooter 100 by carry handle 900, steering assembly 132 and handlebar 134 remain in the folded position inside outer casing 102 of electric scooter 100. That is, latching mechanism 130 in the locked configuration prevents or stops steering assembly 132 and handlebar 134 from being unfolded or removed from inside outer casing 102 of electric scooter 100.

For example, in this embodiment, latching mechanism 130 includes latch spring 216 that extends outwards from frame post 128 and is disposed above a portion of handlebar 134. In an example embodiment, a lower surface of latch spring 216 (e.g., on the bottom of latch spring 216 beneath upper sloped surface 218) is located above first end 800 of handlebar 134. When latch spring 216 of latching mechanism 130 is in the extended position, first end 800 of handlebar 134 is beneath the lower surface of latch spring 216 thereby mechanically locking or preventing upward movement of steering assembly 132 and handlebar 134.

By this arrangement, latching mechanism 130 acts to keep steering assembly 132 and handlebar 134 in the folded position inside outer casing 102 of electric scooter 100. Latching mechanism 130 in the locked configuration allows a user to lift or carry electric scooter 100 using carry handle 900 attached to upper portion 142 of steering shaft 136 without unfolding steering assembly 132 and handlebar 134. With this arrangement, electric scooter 100 may be a convenient personal transport device for a user to travel for "last-mile" or "first-mile" trips to a destination in the riding configuration and can be quickly converted to the stowed configuration to allow the user to carry or transport once they reach their destination.

In some embodiments, electric scooter 100 may be transitioned back from the stowed configuration to the riding configuration by performing the various steps described herein in the reverse order to fully extend all of the components of electric scooter 100 outside of outer casing 102 so that electric scooter 100 may be ridden by a user. In some embodiments, an optional quick release mechanism may be provided for seat post and handlebar latching mechanism 130 to assist a user in quickly and conveniently transitioning steering assembly 132 and handlebar 134 from the folded position back to the extended position.

Figure 10:
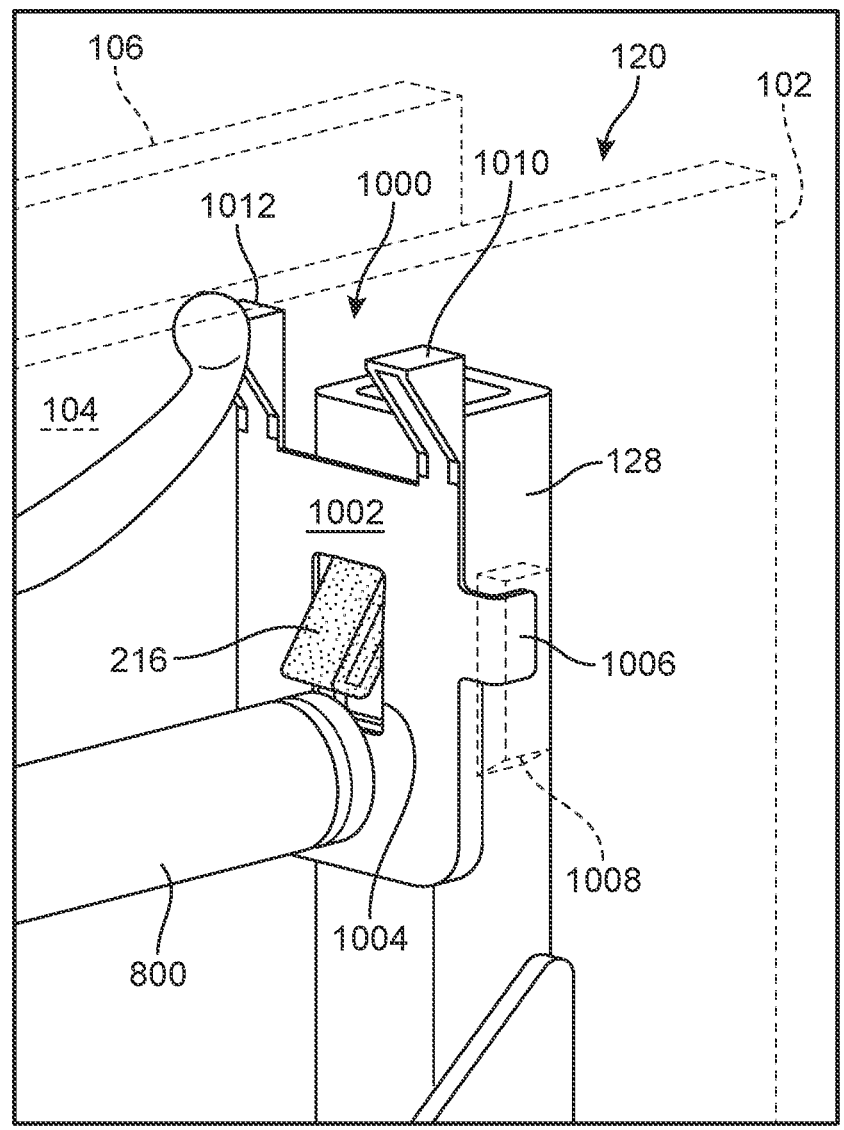
FIG. 10 is a close up view of an example embodiment of an optional quick release mechanism for the seat post and handlebar latching mechanism in accordance with aspects of the present disclosure.

Referring now to FIG. 10, a close up view of a quick release mechanism 1000 for latching mechanism 130 is shown. In this embodiment, quick release mechanism 1000 is disposed on a front side of frame post 128 (e.g., facing towards front edge 108 of electric scooter 100 and facing away from rear edge 110). In an example embodiment, quick release mechanism 1000 includes a plate body 1002, an opening 1004, and a pair of lugs 1006 on each side. Plate body 1002 has a generally rectangular planar configuration that is parallel to the front side of frame post 128. Plate body 1002 also includes opening 1004 having a size and shape configured to allow latch spring 216 to extend through plate body 1002 and extend over first end 800 of handlebar 134.

In some embodiments, quick release mechanism 1000 is configured to move vertically up and down relative to frame post 128. In this embodiment, pair of lugs 1006 on each side of quick release mechanism 1000 fit into a vertical channel 1008 on each side of outer casing 102 of electric scooter 100. Each lug of pair of lugs 1006 of quick release mechanism 1000 may move in the vertical direction between the top and bottom portions of channel 1008 to move quick release mechanism 1000 between a locked position (with lugs 1006 at the top of channel 1008) and a released position (with lugs 1006 at the bottom of channel 1008).

In an example embodiment, quick release mechanism 1000 also includes a pair of engaging members disposed on the top of quick release mechanism 1000 adjacent to opening 120 along top edge 110 of outer casing 102 of electric scooter 100. In this embodiment, the pair of engaging members includes a first engaging member 1010 and a second engaging member 1012 disposed on opposite lateral sides of quick release mechanism 1000. The pair of engaging members, including first engaging member 1010 and second engaging member 1012, are configured to be pressed downward in the vertical direction by a user to move quick release mechanism 1000 from the locked position (shown in FIG. 10) to the released position (shown in FIG. 11).

Figure 11:
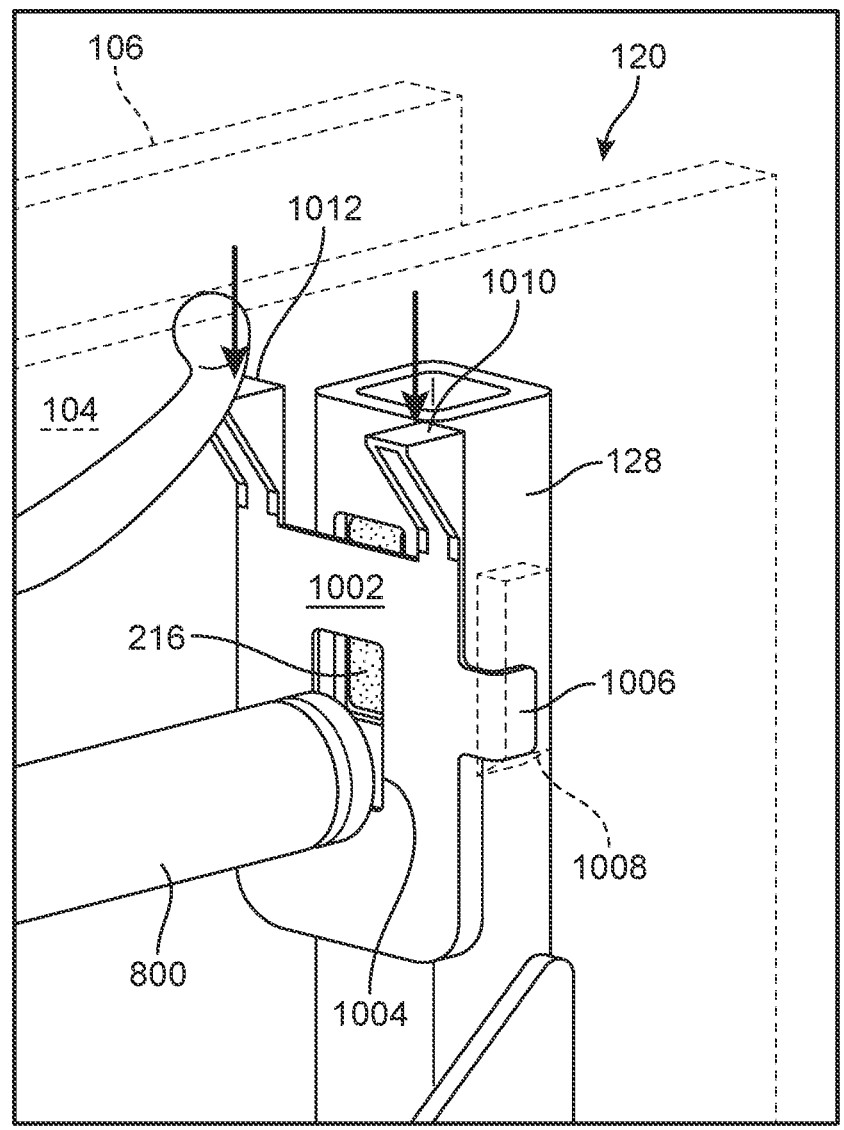
FIG. 11 is a close up view of the example embodiment of the quick release mechanism for the seat post and handlebar latching mechanism in the process of releasing a latch spring in accordance with aspects of the present disclosure.

Referring now to FIG. 11, a close up view of quick release mechanism 1000 for latching mechanism 130 is shown in the process of releasing latch spring 216 to unlock or release latching mechanism 130. As described above, when latching mechanism 130 is in the locked configuration, latch spring 216 is in the extended position over a portion of handlebar 134 (e.g., the lower surface of latch spring 216 extends over first end 800 of handlebar 134 as shown in FIG. 10) to prevent steering assembly 132 and handlebar 134 from being unfolded from the folded position inside electric scooter 100.

In an example embodiment, a user may press downwards on quick release mechanism 1000 in the vertical direction, for example, by pressing on one or both of first engaging member 1010 and second engaging member 1012, to release latch spring 216 from the extended position to the retracted position inside frame post 128. As shown in FIG. 11, when a force is applied to first engaging member 1010 and/or second engaging member 1012, lugs 1006 move vertically downwards within channel 1008 from the top to the bottom to allow quick release mechanism 1000 to move downwards in the vertical direction. This vertical movement of quick release mechanism 1000 causes plate body 1002 to engage and cover upper sloped surface 218 of latch spring 216, moving latch spring 216 inwards into frame post 128 to the retracted position.

In the retracted position, latch spring 216 no longer mechanically locks or prevents movement of steering assembly 132 and handlebar 134. For example, as shown in FIG. 11, when latch spring 216 is pushed inwards to the retracted position by quick release mechanism 1000, latch spring 216 no longer extends over first end 800 of handlebar 134 through opening 1004. In this position, handlebar 134 and steering assembly 132 may be unfolded by pulling upwards to remove steering assembly 132 and handlebar 134 from within the interior of electric scooter 100 through opening 120.

With this arrangement, quick release mechanism 1000 allows latching mechanism 130 to be quickly and conveniently released when electric scooter is in the stowed configuration so that steering assembly 132 and handlebar 134 may be transitioned from the folded position to the extended position and ready electric scooter 100 for riding in the riding configuration.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A compact personal transport device comprising:
an outer casing extending between a top edge and a bottom edge in a vertical direction and extending between a front edge and a rear edge in a horizontal direction;
an opening disposed along a top surface of the outer casing;
a frame post attached internally inside the outer casing, the frame post extending in the vertical direction;
a seat assembly configured to be removably mounted on the frame post of the compact personal transport device, the seat assembly comprising:
a seat having a seat surface;
a seat post attached to an underside of the seat;
the seat post including an opening on one side, the seat post configured to removably attach to the frame post of the compact personal transport device;
a latching mechanism comprising a latch spring that extends outwards from one side of the frame post in an extended position and retracts inside the frame post in a retracted position; and
wherein the latch spring extends through the opening in the seat post when the seat post is attached to the frame post and the latch spring is in the extended position to mechanically lock the seat post to the frame post.

2. The compact personal transport device according to claim 1, wherein the seat post has inside dimensions that are larger than outside dimensions of a top portion of the frame post so that the seat post may extend over a portion of the frame post.

3. The compact personal transport device according to claim 1, further comprising:
a release lever attached to the seat post; and
wherein the release lever is configured to engage the latch spring to push the latch spring inwards into the frame post to the retracted position.

4. The compact personal transport device according to claim 3, wherein the release lever comprises an engaging tip that is angled towards the seat post;
wherein the latch spring comprises an upper sloped surface located on a top of the latch spring; and
wherein the engaging tip of the release lever is configured to contact the upper sloped surface of the latch spring to apply a force to the latch spring to move it from the extended position to the retracted position.

5. The compact personal transport device according to claim 1, further comprising:
a foldable steering assembly configured to steer a front wheel of the compact personal transport device, the steering assembly comprising:
a steering shaft; and
a handlebar secured to steering shaft;
wherein the latch spring in the extended position is configured to extend over a portion of the handlebar of the foldable steering assembly when the foldable steering assembly is folded inside the outer casing to secure the foldable steering assembly inside the outer casing.

6. The compact personal transport device according to claim 5, wherein the steering assembly further comprising a carry handle attached to the steering shaft; and wherein the carry handle extends above the opening along the top surface of the outer casing when the foldable steering assembly is folded inside the outer casing.

7. The compact personal transport device according to claim 6, wherein a lower surface of the latch spring extending over the portion of the handlebar when the foldable steering assembly is folded inside the outer casing mechanically prevents upward movement of the steering assembly when the compact personal transport device is lifted by the carry handle.

8. The compact personal transport device according to claim 5, further comprising a quick release mechanism for releasing the latch spring disposed on a front side of the frame post.

9. The compact personal transport device according to claim 8, wherein the quick release mechanism comprises:

a plate body;

an opening in the plate body, the latch spring configured to extend through the opening to extend over the portion of the handlebar of the foldable steering assembly when the foldable steering assembly is folded inside the compact personal transport device; and a pair of lugs on each side of the plate body, the pair of lugs configured to move in the vertical direction within a channel disposed in the outer casing of the compact personal transport device.

10. The compact personal transport device according to claim 9, wherein a downward force in the vertical direction applied to the quick release mechanism moves the plate body downwards to contact and cover the latch spring to cause the latch spring to move inwards from the extended position to the retracted position inside the frame post.

11. The compact personal transport device according to claim 1, further comprising a tilt mechanism connecting the seat to the seat post on the underside of the seat.

12. The compact personal transport device according to claim 11, further comprising a tilt engagement member that is configured to slide vertically along a sliding track that extends downwards along the seat post from the underside of the seat.

13. The compact personal transport device according to claim 12, wherein the tilt engagement member is configured to engage the tilt mechanism at a top of the sliding track to allow the seat to fold forward relative to the seat post.

14. The compact personal transport device according to claim 1, wherein the latch spring has a triangular-shaped body.

15. The compact personal transport device according to claim 1, wherein the latch spring extends outwards perpendicular to the seat post and the frame post in the extended position.

\* \* \* \* \*